(12) United States Patent
Hammer

(10) Patent No.: US 7,178,734 B1
(45) Date of Patent: Feb. 20, 2007

(54) BARCODE SCANNER INCLUDING A MULTITASKING PATTERN MIRROR

(75) Inventor: Steven J. Hammer, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/173,200

(22) Filed: Jul. 1, 2005

(51) Int. Cl.
G02B 26/00 (2006.01)

(52) U.S. Cl. ............................ 235/462.4; 235/462.32; 235/462.01; 235/462.36; 235/462.43

(58) Field of Classification Search .......... 235/462.01, 235/462.32, 462.36, 462.37, 462.38, 462.39, 235/462.4, 462.43
See application file for complete search history.

(56) References Cited

U.S. PATENT DOCUMENTS 5,610,385 A * 3/1997 He et al. ................. 235/462.4
5,705,802 A * 1/1998 Bobba et al. .......... 235/462.39
6,427,916 B1 * 8/2002 Ishii et al. ............. 235/462.39
6,764,012 B2 * 7/2004 Connolly et al. ...... 235/462.45

* cited by examiner

Primary Examiner—Michael G. Lee
Assistant Examiner—Kristy A. Haupt
(74) Attorney, Agent, or Firm—Paul W. Martin

(57) ABSTRACT

Barcode scanner including a multitasking pattern mirror which allows the size of a scanner to be reduced without decreasing performance. The bar code scanner includes a laser for producing a laser beam, a mirrored spinner for reflecting the laser beam, and a plurality of pattern mirrors for directing the laser beam from the mirrored spinner to produce a scan pattern. The multitasking pattern mirror additionally directs the laser beam from the laser to the mirrored spinner.

7 Claims, 4 Drawing Sheets

BARCODE SCANNER INCLUDING A MULTITASKING PATTERN MIRROR

BACKGROUND

Barcode scanners are well known for their usefulness in retail checkout and inventory control. They typically include a laser diode, a mirrored spinner, a plurality of pattern mirrors, a collector, and a detector. In particular, the function of the pattern mirrors is to direct scanning beams from the mirrored spinner out of the scanner to form a scan pattern. Furthermore, the pattern mirrors direct light reflected from an item bearing a barcode label to the mirrored spinner.

It is important to reduce size of barcode scanners without decreasing performance. Therefore, it would be desirable to provide barcode scanner including a multitasking pattern mirror.

SUMMARY

A barcode scanner including a multitasking pattern mirror is provided.

The bar code scanner includes a laser for producing a laser beam, a mirrored spinner for reflecting the laser beam, and a plurality of pattern mirrors for directing the laser beam from the mirrored spinner to produce a scan pattern. The multitasking pattern mirror additionally directs the laser beam from the laser to the mirrored spinner.

DETAILED DESCRIPTION

Figure 1:
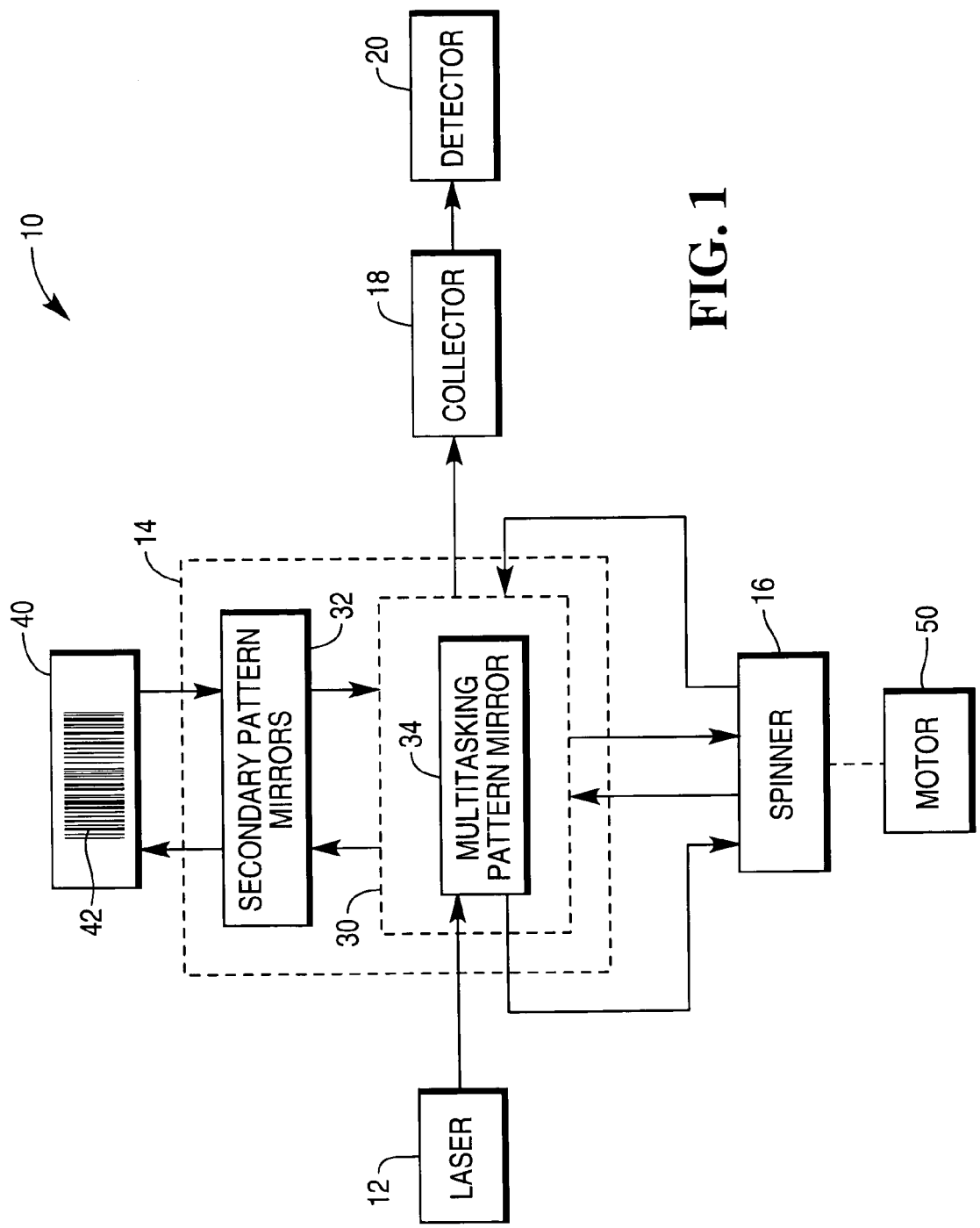
FIG. 1 is a block diagram of a barcode scanner containing a multitasking pattern mirror.

Referring now to FIG. 1, barcode scanner 10 includes laser 12, pattern mirrors 14, mirrored spinner 16, collector 18, and detector 20.

Laser 12 produces a laser beam.

Pattern mirrors 14 direct the laser beam from scanner 10 to produce scan lines for scanning barcode 42 on item 40. Pattern mirrors 14 include primary pattern mirrors 30 and secondary pattern mirrors 32.

Primary pattern mirrors 30 direct the laser beam from mirrored spinner 16 to secondary pattern mirrors 32, and direct light reflected from item 40 from secondary pattern mirrors 32 to mirrored spinner 16.

Primary pattern mirrors 30 includes multitasking pattern mirror 34. Unlike conventional pattern mirrors, multitasking pattern mirror 34 also performs the additional task of directing the laser beam from laser 12 to mirrored spinner 16. For this purpose, multitasking pattern mirror 34 folds the laser beam from laser 12 in order to increase the optical path of the laser beam between laser 12 and mirrored spinner 16. This increase in optical path length allows the outgoing scan lines to diverge enough to fit aperture 66 (FIG. 3) of collector 18 and not obstruct the outgoing scan lines. This optical folding technique results in a more compact scanner design and improved performance.

Secondary pattern mirrors 32 direct the laser beam from primary pattern mirrors 30 towards item 40, and direct light reflected from item 40 towards primary pattern mirrors 30.

Mirrored spinner 16 sweeps the laser beam across primary pattern mirrors 30. Mirrored spinner 16 is rotated by motor 50.

Collector 18 collects light reflected from item 40 from multitasking pattern mirror 34 and directs the reflected light towards detector 20.

Detector 20 converts the reflected light into electrical signals containing information representative of barcode label 42.

Figure 2:
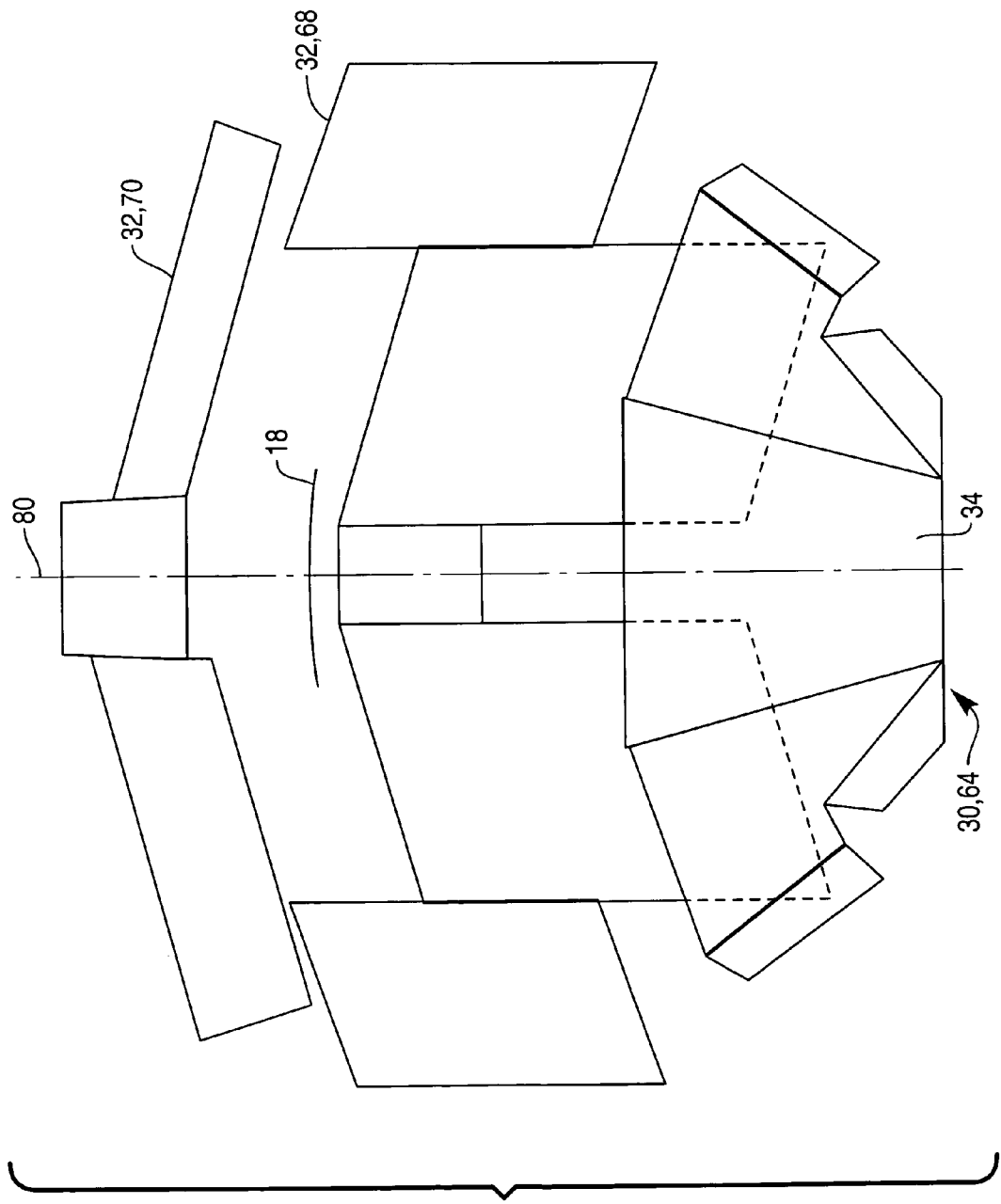
FIG. 2 is a view illustrating arrangement of pattern mirrors within the barcode scanner.
Figure 3:
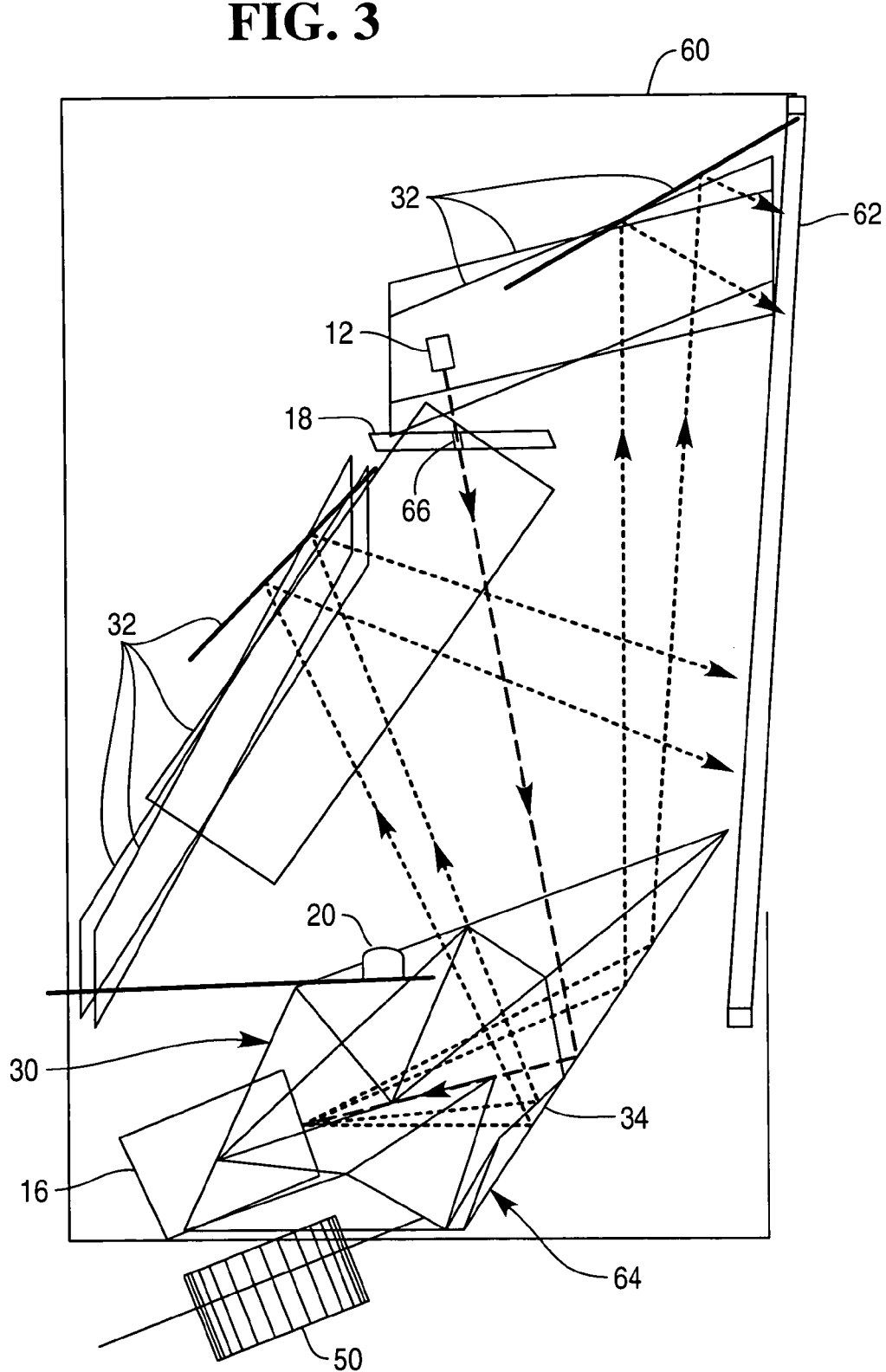
FIG. 3 is a cross-sectional view illustrating paths of outgoing scanning light beam paths.
Figure 4:
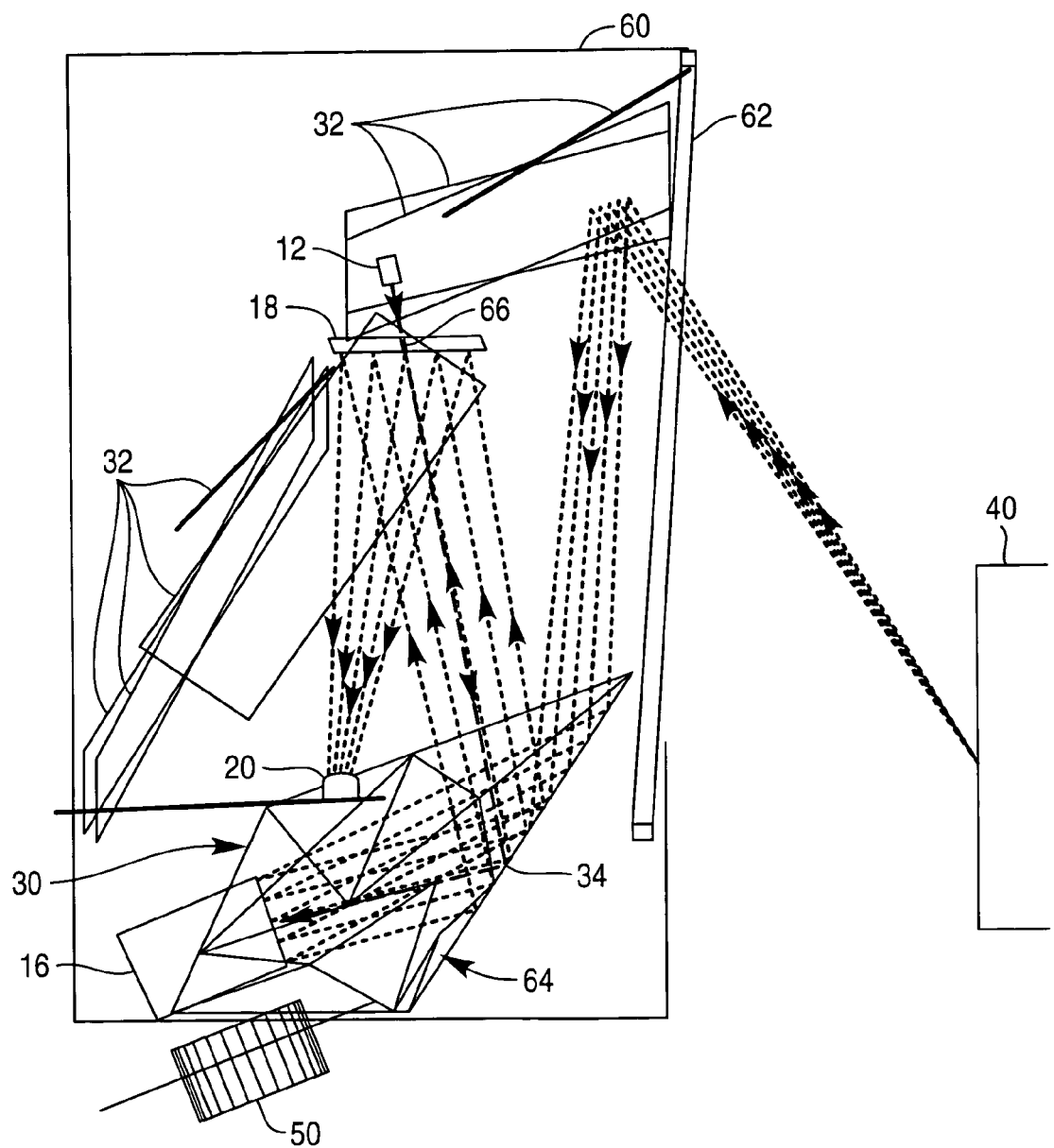
FIG. 4 is a cross-sectional view illustrating paths of incoming scanning reflected light paths.

Turning now to FIGS. 2–4, scanner 10 is illustrated in more detail.

Scanner 10 includes optics housing 60, which includes window 62.

Pattern mirrors 30 are arranged about centerline 80. Primary pattern mirrors 30 include a frustum of mirrors 64 arranged around mirrored spinner 16. Multitasking pattern mirror 34 is in the center mirror of frustum of mirrors 64. Frustum of mirrors 64 is employed to be able to keep the optical path length (i.e. position of best focus) of all the scan lines at the windows relatively constant as well as to make more efficient use of the available scan arc off of the spinner.

Secondary pattern mirrors 32 include first secondary pattern mirrors 68 for directing scan lines and receiving reflected light along first directions, and second secondary pattern mirrors 70 for directing scan lines and receiving reflected light along second directions.

Operation is explained first with reference to FIG. 3. A laser beam from laser 12 passes through aperture 66 in collector 18 on its way to multitasking pattern mirror 34. Multitasking pattern mirror 34 directs the laser beam to mirrored spinner 16. Mirrored spinner 16 sweeps the laser beam across primary pattern mirrors 30, including multitasking pattern mirror 34, as it rotates. Primary pattern mirrors 30 direct the laser beam to secondary pattern mirrors 32, which direct the laser beam through window 62 towards item 40.

With reference to FIG. 4, light reflected from item 40 passes through window 62 and impinges upon secondary pattern mirrors 32. Secondary pattern mirrors 32 direct the reflected light towards primary pattern mirrors 30, including multitasking pattern mirror 34, which direct the reflected light towards mirrored spinner 16. Mirrored spinner 16 directs the reflected light towards primary pattern mirrors 30, including multitasking pattern mirror 34. Primary pattern mirrors direct the reflected light towards collector 18, which is position to accept the reflected light from all primary pattern mirrors 30, not just multitasking pattern mirror 34. Collector 18 directs the reflected light at detector 20.

Although particular reference has been made to certain embodiments, variations and modifications are also envisioned within the spirit and scope of the following claims.

The invention claimed is:

1. A bar code scanner comprising:
   a laser for producing a laser beam;
   a mirrored spinner for reflecting the laser beam; and
   a plurality of pattern mirrors for directing the laser beam from the mirrored spinner to produce a scan pattern, wherein one of the pattern mirrors is optically positioned between the laser and the mirrored spinner and additionally directs the laser beam from the laser to the mirrored spinner.

2. The bar code scanner of claim 1, further comprising:
   a collector for collecting reflected light from the item; and a detector for converting the reflected light received from the collector into electrical signals;

wherein the pattern mirrors receive the reflected light from the item and direct the reflected light to the mirrored spinner, the mirrored spinner directs the reflected light to the one pattern mirror, and the one pattern mirror directs the reflected light to the collector.

3. A bar code scanner comprising:

a housing including an aperture;

a laser in the housing for producing a laser beam;

a mirrored spinner in the housing for reflecting the laser beam and for reflecting reflected light from an item;

first and second groups of pattern mirrors in the housing;

a collector in the housing for collecting reflected light from the item including an aperture through which the laser beam from the laser passes; and a detector in the housing for converting the reflected light into electrical signals;

wherein the first group of pattern mirrors directs the laser beam from the mirrored spinner to the second group of pattern mirrors and the second group of pattern mirrors directs the laser beam through the aperture to produce a scan pattern for scanning the item;

wherein the second group of pattern mirrors directs the reflected light from the item to the first group of pattern mirrors and the first group of pattern mirrors directs the reflected light to the mirrored spinner; and wherein one mirror of the first group of pattern mirrors folds the laser beam from the laser, directs the laser beam to the mirrored spinner, and directs the reflected light from the mirrored spinner to the collector.

4. A scan method comprising:

producing a laser beam by a laser;

folding the laser beam and directing the laser beam towards a mirrored spinner by a multi-purpose pattern mirror optically positioned between the laser and the mirrored spinner;

reflecting the laser beam towards a plurality of pattern mirrors, including the multi-purpose pattern mirror, by the mirrored spinner; and directing the laser beam from the mirrored spinner to produce a scan pattern for scanning an item bearing a bar code label by the plurality of pattern mirrors.

5. The method of claim 4, further comprising:

receiving reflected light from the item by the plurality of pattern mirrors;

directing the reflected light towards the mirrored spinner by the plurality of pattern mirrors;

directing the reflected light towards the multi-purpose pattern mirror by the mirrored spinner;

directing the reflected light towards a collector by the multi-purpose pattern mirror; and directing the reflected light towards a detector by the collector.

6. A bar code scanner comprising:

a laser for producing a laser beam;

a mirrored spinner for reflecting the laser beam;

a plurality of pattern mirrors for directing the laser beam from the mirrored spinner to produce a scan pattern, wherein one of the pattern mirrors additionally directs the laser beam from the laser to the mirrored spinner;

a collector for collecting reflected light from the item; and a detector for converting the reflected light received from the collector into electrical signals;

wherein the pattern mirrors receive the reflected light from the item and direct the reflected light to the mirrored spinner, the mirrored spinner directs the reflected light to the one pattern mirror, and the one pattern mirror directs the reflected light to the collector.

7. A scan method comprising:

producing a laser beam by a laser;

folding the laser beam and directing the laser beam towards a mirrored spinner by a multi-purpose pattern mirror;

reflecting the laser beam towards a plurality of pattern mirrors, including the multi-purpose pattern mirror, by the mirrored spinner;

directing the laser beam from the mirrored spinner to produce a scan pattern for scanning an item bearing a bar code label by the plurality of pattern mirrors;

receiving reflected light from the item by the plurality of pattern mirrors;

directing the reflected light towards the mirrored spinner by the plurality of pattern mirrors;

directing the reflected light towards the multi-purpose pattern mirror by the mirrored spinner;

directing the reflected light towards a collector by the multi-purpose pattern mirror; and directing the reflected light towards a detector by the collector.

* * * * *